United States Patent [19]
O'Grady

[11] 3,907,930
[45] Sept. 23, 1975

[54] TOUGHENED POLYMERIC POLYBLEND HAVING HIGH FLOW AND DUCTILITY

[75] Inventor: Vincent J. O'Grady, North Wilbraham, Mass.

[73] Assignee: Monsanto Company, St. Louis, Mo.

[22] Filed: Nov. 9, 1973

[21] Appl. No.: 414,468

[52] U.S. Cl. ...... 260/876 B; 260/876 R; 260/880 R; 260/880 B
[51] Int. Cl. .................. C08g 15/00; C08g 19/00
[58] Field of Search ................................. 260/876 B

[56] References Cited
UNITED STATES PATENTS

| | | | |
|---|---|---|---|
| 3,429,951 | 2/1969 | Childers | 260/876 B |
| 3,476,829 | 11/1969 | Gruver | 260/876 B |
| 3,485,894 | 12/1969 | Porter | 260/876 B |
| 3,491,166 | 1/1970 | Childers | 260/876 B |
| 3,509,237 | 4/1970 | Aubrey | 260/876 B |
| 3,536,784 | 10/1970 | Skendrovich | 260/876 B |
| 3,642,947 | 2/1972 | Stein | 260/876 B |
| 3,676,527 | 7/1972 | Babock | 260/876 B |
| 3,682,768 | 8/1972 | Adams | 260/876 B |

FOREIGN PATENTS OR APPLICATIONS

| | | | |
|---|---|---|---|
| 1,145,923 | 3/1969 | United Kingdom | 260/876 B |

*Primary Examiner*—Paul Lieberman
*Attorney, Agent, or Firm*—Joseph S. Nelson; Edward P. Grattan; James C. Logomasini

[57] ABSTRACT

The present invention relates to a toughened polymeric polyblend having high flow and ductility comprising a polymer of polyvinylidene aromatic monomer having dispersed therein a diene rubber grafted with said monomer and a block copolymer of said monomer and a diene monomer, said block copolymer comprising about 55 to 90 weight percent of a monovinylidene aromatic monomer and about 10–45 weight percent of a diene monomer.

19 Claims, No Drawings

TOUGHENED POLYMERIC POLYBLEND HAVING HIGH FLOW AND DUCTILITY

BACKGROUND OF THE INVENTION

Polymeric polyblends such as polystyrene having a dispersed polybutadiene rubber grafted with polystyrene and known as high impact polystyrene have been commercially produced. Such toughened polyblends have great utility as engineering plastics being used for appliance housing and structural parts.

The grafted dispersed rubber phase provides toughness by stabilizing the crazing and failure of the brittle matrix phase when subjected to deformation. Generally, the highest percentage by weight of the rubber moiety of the grafted rubber used, considering a balance of properties, is about 1 to 15 by weight in that the rubber moiety is incompatible with the matrix and acts much as a filler lowering the melt flow and gloss of the polyblend in molding and extrusion operations.

The grafting of the dispersed rubber phase with molecules similar to the matrix aids in dispersing the rubber as discrete rubber particles and maintaining its particle size as dispersed. Generally, the particle size diameter of the rubber particles can range from about 0.1 to 20 microns in commercially polyblends. The larger the particle size the higher the impact strength but the lower the gloss, hence the preferred range is about 0.5 to 5 microns for a balance of properties including melt flow, elongation at fail, heat distortion, modulus, etc., as well as impact strength and gloss.

Commercial polyblends, such as impact polystyrene, then have had their properties optimized within the ranges of rubber described above along with grafting and particle size control. However, engineering design is requiring higher and higher performance polyblends with greater toughness, modulus, etc., but with increased flow and gloss for ease in fabrication. Increasing the rubber content for toughness then gives lower modulus, flow and gloss and is not generally commercially feasible.

The present invention provides a composition for polymeric polyblends that gives improved toughness along with increased processability such as melt flow, gloss and elongation at fail providing a novel polyblend with an improved balance of properties.

In particular, it has found that block copolymers of mmonovinyl aromatic monomers and conjugated diene monomers which have about 55 to 90 percent by weight of the monovinyl aromatic monomer, such as a styrene monomer, and 10 to 45 percent by weight of conjugated diene monomer such as butadiene will melt colloid into a polymeric polyblend such as impact polystyrene as a dispersed small particle in the range of 0.004 to 0.05 microns and improve its physical properties and at the same time increase its processability providing a polyblend with improved engineering properties and great commercial utility. This discovery was unexpected in that it was thought that high styrene block copolymers would be compatible with the rigid matrix phase and not disperse as a separate phase which could reinforce the rigid phase yet increase its flow. The function of these very small particles is not completely understood. Phase micrographs show the copolymer to be dispersed as very small particles in great numbers in the matrix phase. As a filler they should reduce flow but instead they increase melt flow indicating that they aid shearing of the matrix phase under deformation producing some form of shear banding that aids flow and elongation to fail providing a polyblend that has a high level of toughness but high flow and gloss along with a good balance of other properties such as modulus, heat distortion, etc.

SUMMARY OF THE INVENTION

The present invention relates to a polymeric polyblend comprising, based on the total weight of the polymeric components, of:

A. about 55 to 98 weight percent of a monoalkenyl aromatic polymer, comprising at least one monoalkenyl aromatic monomer of the formula:

where Ar is selected from the group consisting of phenyl, halophenyl alkylphenyl, alkylhalophenyl and mixtures thereof and X is selected from the group consisting of hydrogen, halogen and an alkyl radical of less than three carbon atoms and mixtures thereof, B. about 1 to 15 percent by weight of a diene rubber moiety dispersed as rubber particles, said rubber particles being grafted with and having occluded said monoalkenyl aromatic polymer, C. about 1 to 30 percent by weight of a block copolymer comprising a first block of from about 55–90 weight percent of said monoalkenyl aromatic monomer and a second block of from about 10 to 45 weight percent of a diene monomer.

The present invention also relates to a method of improving the flow and ductile properties of a polymeric polyblend wherein said block copolymer is dispersed in said polyblend by the steps of dry blending and melt mixing.

DESCRIPTION OF THE PREFERRED EMBODIMENTS

The alkenyl aromatic polymer of the polyblend comprises at least one monoalkenyl aromatic monomer of the formula

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed. The average molecular weight of the monoalkenyl aromatic polymers can range from 20,000 to 100,000 Staudinger, preferably 40,000 to 60,000.

The diene rubbers of the polyblend are any rubber polymer (a rubbery polymer having a second order transition temperature not higher than 0° centigrade, preferably not higher than −20° centigrade, as determined by ASTM Test D-746-52T) of one or more of the conjugated, 1,3-dienes, e.g. butadiene, isoprene, 2-chloro-1,3 butadiene, 1 chloro-1,3 butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl -4- chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and vinylidene chlorides and bromides, etc.); and the like.

Although the rubber may contain up to about 2.0 percent of a crosslinking agent, based on the weight of the rubber-forming monomer of monomers, crosslinking may present problems in dissolving the rubber in the monomers for the graft polymerization reaction. In addition, excessive crosslinking can result in loss of the rubbery characteristics.

A preferred group of rubbers are the stereospecific polybutadiene rubbers formed by the polymerization of 1,3 butadiene. These rubbers have a cis-isomer content of about 30–98 percent and a trans-isomer content of about 70–2 percent and generally contain at least about 85 percent of polybutadiene formed by 1,4 addition with no more than about 15 percent by 1,2 addition. Mooney viscosities of the rubber (ML-4, 212°F.) can range from about 20 to 70 with a second order transition temperature of from about −50°C. to −105°C. as determined by ASTM Test D-746-52T.

The diene rubber can be grafted with the above described monoalkenyl aromatic monomers and can be prepared by mass-suspension polymerization methods as disclosed in U.S. Pat. No. 3,488,743. Those skilled in the art are aware that if one dissolves a diene rubber in the described monomers, that during polymerization the rubber forms a separate rubber-monomer phase with the monomer and the polymer polymerized forms a polymer-monomer phase with the monomer. When the polymer-monomer phase becomes larger during polymerization then the rubber-monomer phase, inverts and disperses as rubber-monomer droplets in the polymer-monomer phase. As the polymerizing mixture is completely polymerized, either by mass or suspension polymerization, e.g. the rubber-monomer droplets polymerize to discrete rubber particles dispersed in the polymer phase forming a polyblend of grafted rubber particles in the polymer phase. The rubber particles are found to be grafted with polymer molecules and also contain occluded polymer of the described monomers.

It has been found possible to analyze the amount of total occluded polymer phase and grafted polymers. The final polymerized polyblend produce (1 gram) is dispersed in a 50/50 acetone/methyl ethyl ketone solvent (10 ml.) which dissolves the polymer phase matrix leaving the rubber phase dispersed. The rubber phase is separated from the dispersion by centrifuge as a gel and dried in a vacuum oven at 50°C. for 12 hours and weighed as a dry gel.

$$\frac{\% \text{ Dry gel}}{\text{in Polyblend}} = \frac{\text{Weight of dry gel}}{\text{Weight of polyblend}} \times 100$$

$$\begin{pmatrix} \% \text{ Graft and} \\ \text{Occlusions} \\ \text{in Rubber} \end{pmatrix} = \frac{\% \text{ dry gel} - \% \text{ rubber}}{\text{Percent rubber*}} \times 100$$

*Percent rubber determined by infra-red spectrochemical analysis of the dry gel $$\begin{pmatrix} \text{Parts** by weight} \\ \text{of graft polymer} \\ \text{and occluded} \\ \text{polymer per unit} \\ \text{weight of rubber} \end{pmatrix} = \frac{\% \text{ dry gel} - \% \text{ rubber}}{\text{Percent rubber}}$$

**The present invention preferably has present about 0.5 to 4 grams of occluded and grafted polymer per gram of diene rubber particle.

The amount of grafted and occluded polymer contained in the rubber particle can vary being present in said grafted diene rubber in an amount of from 0.5 to 4.0 parts for each part or rubber, preferably from about 1.0 to 3.5 parts for each part of rubber.

The swelling index of the rubber graft particles is determined by taking the dry gel above and dispersing it in toluene for 12 hours. The gel is separated by centrifuge and the supernatant toluene drained free. The wet gel is weighed and then dried in a vacuum oven for 12 hours at 50°C. and weighed.

$$\text{Swelling Index} = \frac{\text{weight of wet gel}}{\text{weight of dry gel}}$$

As described earlier the amount of occlusions and graft polymer present in the rubber particle is present in the amount of about 0.5 to 4 part for each part of diene rubber. The percent dry gel measured above then is the percent gel in the polymerized polyblend and represents the dispersed rubber phase having polymeric occlusions and polymeric graft. The percent gel varies with the percent rubber charged in the monomer composition and the total amount of graft and occluded polymer present in the rubber phase.

The swelling index of the rubber as determined above is important to the final properties of the polyblend. A low swelling index indicates that the rubber has been crosslinked by the occluded monomer in the rubber particle. The crosslinking stabilizes the particle as to morphology so that the rubber can be dispersed and maintain a particular average particle size critical to the toughness of the polyblend. Generally, a swelling index of 7 to 25, preferably 8–20 provides a rubber particle with sufficient crosslinking for good physical properties in the polyblend.

The weight average particle size of the rubber particle can range from 0.1 to 20.0 microns, preferably 0.5 to 5.0 microns. The weight average particle size is measured with a photosedimentometer by the published procedure of Graves, M. J. et.al., "Size Analysis of Subsieve Powders Using a Centrifugal Photosedimentometer," British Chemical Engineering 9:742–744 (1964). A Model 3000 Particle Size Analyzer from Martin Sweets Co., 3131 West Market Street, Louisville, Kentucky was used. The rubber is grafted with the monomers described and the grafted polymer preferably has the same monomer composition as the polymer into which the grafted rubber is dispersed.

The block copolymer of a monoalkenyl aromatic monomer and a diene monomer can be prepared by the methods disclosed in U.S. Pat. No. 3,476,829. The monoalkenyl aromatic and diene monomers then can be used in the block copolymer have been described. The block copolymers used in the present invention can have a monoalkenyl aromatic monomer content of about 55 to 90 weight percent, preferably about 60 to 80 weight percent as a first block and a diene monomer content of from 10 to 45 weight percent preferably 20 to 40 weight percent as a second block. Generally these block copolymers are not classed as rubbers but as polymonoalkenyl aromatic copolymers, e.g. a styrene block copolymer. The average weight of the block copolymer should generally be in the range of that of the matrix to insure compatibility with the matrix. Such block copolymers then can range from an average molecular weight of 20,000 to 100,000 Staudinger preferably 40,000 to 60,000.

The block copolymer when dispersed in the polyblend forms particles which can be observed under a electronmicroscope using osmium tetroxide staining and the method published by K. Kato in the Journal of Polymer Science, 7, 38, (1967). Since the osmium tetroxide only stains the rubber portion of the molecule one observes the diene rubber block or second block portion of the molecule as a particle believed to be in ball-like form because of its incompatibility with the matrix phase. Hence, the higher the weight percentage of rubber in the block copolymer the larger the particle observed and correspondingly the lower the percentage rubber the smaller the particle.

Considering that the copolymer can have from about 10 to 45 percent by weight of a diene rubber the particle size of the diene rubber block moiety as dispersed in the polymeric polyblend can range from about 0.004 to 0.05 microns preferably from about 0.006 to 0.02 microns.

The polymeric polyblend comprises, based on the total weight of the polyblend about 55 to 98 weight percent of a monoalkenyl aromatic polymer, e.g. polystyrene, which includes that polymer in the matrix phase and that grafted and occluded in the diene rubber phase. It has been found most practical to prepare the monoalkenyl aromatic polymer and the grafted diene rubber polymer simultaneously as disclosed above by dissolving the diene rubber in the monoalkenyl aromatic monomer and polymerizing the monomer by mass polymerization forming these two components of the polyblend simultaneously. The range of rubber dissolved can range from 1 to 15 weight percent preferably from 2.5 to 10 weight percent of the polymerized polyblend.

The block copolymers component then admixed with the polymerized polyblend by melt colloiding can replace the monoalkenyl aromatic polymer of the matrix on a weight percent basis of from about 1 to 30 percent preferably 5 to 25 percent providing high flow and ductility to the matrix phase of the polymeric polyblend.

A method for improving the flow and ductility of a polymeric polyblend comprises the following steps:
1. Dry blending the components (A), (B) and (C) to form a dry blend. Dry blending can be carried out by many methods using conical blenders and mixers for example.
2. Melt mixing (A), (B) and (C) can be carried out by extrusion, banburying, mill rolling, etc. Extrusion is preferred wherein the dry blend is melt colloided at temperatures of 425°–525°F., pressures of 2000 psi or greater with an extruder having a length to diameter ratio of 20 to 1 or greater. If component (A) and (B) are formed as a polymerized polyblend then said polymerized polyblend can be dry blended with component (C) and melt-mixed to form said polymeric polyblend. The melt mixing is sufficient to disperse the component (C) as small particles wherein said second block has an average particle size diameter of 0.004 to 0.05 microns preferably 0.005 to 0.02 microns.

EXAMPLES 1 – 6

A polymerized polyblend comprising 86.3 weight percent polystyrene and 13.7 percent polybutadiene rubber was used as a base polymer for several polymeric polyblends. The polymerized polyblend was blended with polystyrene and a styrene block copolymer in varying proportions and tested to determine the physical properties of the polymeric polyblend. Examples 1 and 2 were tested without block copolymer for comparison purposes.

The polybutadiene rubber in the polymerized polyblend was a stereospecific rubber having a cis-isomer content of about 35 percent, a trans-isomer content of about 65 percent, about 90 percent 1,4 addition, about 10 percent 1,2 addition and a Mooney viscosity of about 55(ML-4, 212°F.). The rubber, as dispersed in the polymerized polyblend, has a weight average particle size of about 2.2 microns, about 2.5 parts of polystyrene grafted and occluded per 1 part of rubber and a swelling index of about 10. The polystyrene matrix phase has an average molecular weight of about 47,000 Staudinger. The polystyrene homopolymer used in the polymeric blend has an average molecular weight of about 54,000 Staudinger. The styrene block copolymer used comprises 75 percent styrene and 25 percent butadiene as polystyrene and polybutadiene blocks with the copolymer having an average molecular weight of about 50,000 Staudinger. The base polymer, the polystyrene polymer and the styrene block copolymer in pellet form were dry blended in a conical blender and fed to a 1½ extruder having a L/D ratio of 24:1 operating at 40 rpm., 475°F. and 2100 psi back pressure wherein the block copolymer was melt-mixed with the other two polymers forming a polymeric polyblend and extruded into pellets for testing. Compositions were prepared and tested with the data shown in Table 1. All proportions are shown as weight percent with the polymeric polyblend comprising 100 weight percent.

TABLE I

| | EXAMPLES 1 – 6 | | | | | |
|---|---|---|---|---|---|---|
| | 1 Control | 2 Control | 3 | 4 | 5 | 6 |
| Polystyrene | 86.3 | 94.5 | 89.8 | 80.3 | 70.9 | 43.1 |
| Graft Rubber | 13.7 | 5.5 | 5.2 | 4.7 | 4.1 | 6.9 |
| Block Copolymer | 0.0 | 0.0 | 5.0 | 15.0 | 25.0 | 50.0 |
| Copolymer Rubber | 0.0 | 0.0 | 1.25 | 3.8 | 6.3 | 12.5 |
| Total Rubber | 13.7 | 5.5 | 6.5 | 8.5 | 10.4 | 19.4 |
| Melt Flow[1] | 1.12 | 2.39 | 2.66 | 2.86 | 3.09 | <1.0 |
| Gloss[2] | 20 | 46 | 55 | 81 | 72 | — |
| Dart Impact[3] | 48 | 26 | 27 | 35 | 34 | 35 |
| Izod Impact[4] | 1.57 | 1.19 | 1.18 | 1.25 | 1.15 | 2.81 |
| Tensile Strength[5] (fail) | 4100 | 4060 | 3870 | 3910 | 3880 | 3320 |
| Tensile Modulus[6] | 1.38 | 3.22 | 2.89 | 3.06 | 3.16 | 1.82 |
| Elongation[7] (fail) | 136 | 52.9 | 55.2 | 62.0 | 56 | — |
| HDTUL[8] | 81.7 | 86 | 85 | 84 | 82 | 79 |

[1]Melt Flow Index (gms/10 min.) ASTM D1238-65T (G)
[2]Gloss - Hunter Units Peak ASTM D523-67
[3]Falling Dart Impact Strength (ft.lbs.) ASTM D1709-67
[4]Izod Impact Strength, ½" × ½", 23°F., ft.lbs./inch notch ASTM D256-70
[5]Tensile Strength (psi) fail ASTM D638-68 type 1⅛" specimen
[6]Tensile Modulus - ASTM D638-68
[7]Elongation at Fail (%) ASTM D638-68
[8]Heat Distortion Under Load. (°C) ASTM D648 (264 psi)

The polyblends were analyzed for rubber particle size by the described method. The block copolymer particles had a rubber moiety average particle diameter of about 0.01 microns for each polymeric polyblend using the block copolymer with 25 percent polybutadiene and 75 percent polystyrene.

Comparing the control examples without block copolymer with those polymeric polyblends having varying amounts of block copolymer it is evident from the test data that the styrene block copolymer can be polyblended with polystyrene and grafted diene rubber to form a polymeric polyblend having greatly improved melt flow and gloss properties. The polymeric polyblend also retains a high modulus, elongation at fail, heat distortion and toughness as shown by the impact tests. It was unexpected that the modulus would remain high along with the heat distortion on adding large amounts of the block copolymer to the polymeric polyblend. It is to be noted that the total rubber including the grafted and block rubber is about 10.4 weight percent yet the modulus and gloss remains high along with a high melt flow. This balance of properties provides a polymeric polyblend for engineering structural uses that can be easily fabricated providing a polymeric polyblend of high utility.

EXAMPLES 7 – 9

Polymeric polyblends are prepared using the procedures and materials of Examples 1–6 except where noted.

In Examples 7–9 the block copolymers used have different weight percentages of polybutadiene as shown below:

| Example | Weight % Polybutadiene | Weight % Polystyrene |
|---|---|---|
| 7 | 45 | 55 |
| 8 | 15 | 85 |
| 9 | 10 | 90 |

The test data on compositions containing the above block copolymers are shown in Table II with proportions shown as weight percent.

TABLE II

| | EXAMPLES 7 – 9 | | |
|---|---|---|---|
| | 7 | 8 | 9 |
| Polystyrene | 80.3 | 80.3 | 80.3 |
| Graft Rubber | 4.7 | 4.7 | 4.7 |
| Block Copolymer | 15.0 | 15.0 | 15.0 |
| Copolymer | (55/45) | (85/15) | (90/10) |
| Rubber | 6.8 | 2.3 | 1.5 |
| Total Rubber | 11.5 | 7.0 | 6.2 |
| Melt Flow | 2.60 | 2.90 | 3.05 |
| Gloss | 60 | 83 | 85 |
| Dart Impact | 37 | 32 | 30 |
| Izod Impact | 1.30 | 1.20 | 1.19 |
| Tensile Modulus | 3.15 | 3.02 | 2.90 |

The polymer polyblends having block copolymers with 45 percent, 15 percent and 10 percent polybutadiene were analyzed for particle size and the particle havng an average particle diameter of 0.05, 0.006 and 0.004 microns for the rubber moiety of the copolymer particle. It is evident from the data that the smaller particles of the 90/10 styrene/butadiene S/B block copolymer provide higher flow and gloss than the larger particles of 55/45 S/B block copolymer. However, a balance of properties can be realized, e.g. the large particles can provide higher impact strength and modulus if those properties should be maximized yet have improved flow and impact over convention high impact polystyrene polyblends using large particle size grafted rubbers only as shown in Examples 1 and 2.

It will be appreciated that, while the embodiments of the present invention as shown and described herein are necessarily limited to a few forms of the present invention, many variations and modifications thereof are feasible and practical without departing from the spirit and scope of the present invention disclosed and claimed herein.

ticle with sufficient crosslinking for good physical properties in the polyblend.

The weight average particle size of the rubber particle can range from 0.1 to 20.0 microns, preferably 0.5 to 5.0 microns. The weight average particle size is measured with a photosedimentometer by the published procedure of Graves, M. J. et.al., "Size Analysis of Subsieve Powders Using a Centrifugal Photosedimentometer," British Chemical Engineering 9:742–744 (1964). A Model 3000 Particle Size Analyzer from Martin Sweets Co., 3131 West Market Street, Louisville, Kentucky was used. The rubber is grafted with the monomers described and the grafted polymer preferably has the same monomer composition as the polymer into which the grafted rubber is dispersed.

The block copolymer of a monoalkenyl aromatic monomer and a diene monomer can be prepared by the methods disclosed in U.S. Pat. No. 3,476,829. The monoalkenyl aromatic and diene monomers then can be used in the block copolymer have been described. The block copolymers used in the present invention can have a monoalkenyl aromatic monomer content of about 55 to 90 weight percent, preferably about 60 to 80 weight percent as a first block and a diene monomer content of from 10 to 45 weight percent preferably 20 to 40 weight percent as a second block. Generally these block copolymers are not classed as rubbers but as polymonoalkenyl aromatic copolymers, e.g. a styrene block copolymer. The average weight of the block copolymer should generally be in the range of that of the matrix to insure compatibility with the matrix. Such block copolymers then can range from an average molecular weight of 20,000 to 100,000 Staudinger preferably 40,000 to 60,000.

The block copolymer when dispersed in the polyblend forms particles which can be observed under a electronmicroscope using osmium tetroxide staining and the method published by K. Kato in the Journal of Polymer Science, 7, 38, (1967). Since the osmium tetroxide only stains the rubber portion of the molecule one observes the diene rubber block or second block portion of the molecule as a particle believed to be in ball-like form because of its incompatibility with the matrix phase. Hence, the higher the weight percentage of rubber in the block copolymer the larger the particle observed and correspondingly the lower the percentage rubber the smaller the particle.

Considering that the copolymer can have from about 10 to 45 percent by weight of a diene rubber the particle size of the diene rubber block moiety as dispersed in the polymeric polyblend can range from about 0.004 to 0.05 microns preferably from about 0.006 to 0.02 microns.

The polymeric polyblend comprises, based on the total weight of the polyblend about 55 to 98 weight percent of a monoalkenyl aromatic polymer, e.g. polystyrene, which includes that polymer in the matrix phase and that grafted and occluded in the diene rubber phase. It has been found most practical to prepare the monoalkenyl aromatic polymer and the grafted diene rubber polymer simultaneously as disclosed above by dissolving the diene rubber in the monoalkenyl aromatic monomer and polymerizing the monomer by mass polymerization forming these two components of the polyblend simultaneously. The range of rubber dissolved can range from 1 to 15 weight percent preferably from 2.5 to 10 weight percent of the polymerized polyblend.

The block copolymers component then admixed with the polymerized polyblend by melt colloiding can replace the monoalkenyl aromatic polymer of the matrix on a weight percent basis of from about 1 to 30 percent preferably 5 to 25 percent providing high flow and ductility to the matrix phase of the polymeric polyblend.

A method for improving the flow and ductility of a polymeric polyblend comprises the following steps:

1. Dry blending the components (A), (B) and (C) to form a dry blend. Dry blending can be carried out by many methods using conical blenders and mixers for example.
2. Melt mixing (A), (B) and (C) can be carried out by extrusion, banburying, mill rolling, etc. Extrusion is preferred wherein the dry blend is melt colloided at temperatures of 425°–525°F., pressures of 2000 psi or greater with an extruder having a length to diameter ratio of 20 to 1 or greater. If component (A) and (B) are formed as a polymerized polyblend then said polymerized polyblend can be dry blended with component (C) and meltmixed to form said polymeric polyblend. The melt mixing is sufficient to disperse the component (C) as small particles wherein said second block has an average particle size diameter of 0.004 to 0.05 microns preferably 0.005 to 0.02 microns.

EXAMPLES 1 – 6

A polymerized polyblend comprising 86.3 weight percent polystyrene and 13.7 percent polybutadiene rubber was used as a base polymer for several polymeric polyblends. The polymerized polyblend was blended with polystyrene and a styrene block copolymer in varying proportions and tested to determine the physical properties of the polymeric polyblend. Examples 1 and 2 were tested without block copolymer for comparison purposes.

The polybutadiene rubber in the polymerized polyblend was a stereospecific rubber having a cis-isomer content of about 35 percent, a trans-isomer content of about 65 percent, about 90 percent 1.4 addition, about 10 percent 1,2 addition and a Mooney viscosity of about 55(ML-4, 212°F.). The rubber, as dispersed in the polymerized polyblend, has a weight average particle size of about 2.2 microns, about 2.5 parts of polystyrene grafted and occluded per 1 part of rubber and a swelling index of about 10. The polystyrene matrix phase has an average molecular weight of about 47,000 Staudinger. The polystyrene homopolymer used in the polymeric blend has an average molecular weight of about 54,000 Staudinger. The styrene block copolymer used comprises 75 percent styrene and 25 percent butadiene as polystyrene and polybutadiene blocks with the copolymer having an average molecular weight of about 50,000 Staudinger. The base polymer, the polystyrene polymer and the styrene block copolymer in pellet form were dry blended in a conical blender and fed to a 1½ extruder having a L/D ratio of 24:1 operating at 40 rpm., 475°F. and 2100 psi back pressure wherein the block copolymer was melt-mixed with the other two polymers forming a polymeric polyblend and extruded into pellets for testing. Compositions were prepared and tested with the data shown in Table 1. All proportions are shown as weight percent with the polymeric polyblend comprising 100 weight percent.

TABLE I

|  | EXAMPLES 1 – 6 | | | | | |
|---|---|---|---|---|---|---|
|  | 1 Control | 2 Control | 3 | 4 | 5 | 6 |
| Polystyrene | 86.3 | 94.5 | 89.8 | 80.3 | 70.9 | 43.1 |
| Graft Rubber | 13.7 | 5.5 | 5.2 | 4.7 | 4.1 | 6.9 |
| Block Copolymer | 0.0 | 0.0 | 5.0 | 15.0 | 25.0 | 50.0 |
| Copolymer Rubber | 0.0 | 0.0 | 1.25 | 3.8 | 6.3 | 12.5 |
| Total Rubber | 13.7 | 5.5 | 6.5 | 8.5 | 10.4 | 19.4 |
| Melt Flow[1] | 1.12 | 2.39 | 2.66 | 2.86 | 3.09 | <1.0 |
| Gloss[2] | 20 | 46 | 55 | 81 | 72 | — |
| Dart Impact[3] | 48 | 26 | 27 | 35 | 34 | 35 |
| Izod Impact[4] | 1.57 | 1.19 | 1.18 | 1.25 | 1.15 | 2.81 |
| Tensile Strength[5] (fail) | 4100 | 4060 | 3870 | 3910 | 3880 | 3320 |
| Tensile Modulus[6] | 1.38 | 3.22 | 2.89 | 3.06 | 3.16 | 1.82 |
| Elongation[7] (fail) | 136 | 52.9 | 55.2 | 62.0 | 56 | — |
| HDTUL[8] | 81.7 | 86 | 85 | 84 | 82 | 79 |

[1] Melt Flow Index (gms/10 min.) ASTM D1238-65T (G)
[2] Gloss - Hunter Units Peak ASTM D523-67
[3] Falling Dart Impact Strength (ft.lbs.) ASTM D1709-67
[4] Izod Impact Strength, ½" × ½", 23°F., ft.lbs./inch notch ASTM D256-70
[5] Tensile Strength (psi) fail ASTM D638-68 type 1⅛" specimen
[6] Tensile Modulus - ASTM D638-68
[7] Elongation at Fail (%) ASTM D638-68
[8] Heat Distortion Under Load. (°C) ASTM D648 (264 psi)

The polyblends were analyzed for rubber particle size by the described method. The block copolymer particles had a rubber moiety average particle diameter of about 0.01 microns for each polymeric polyblend using the block copolymer with 25 percent polybutadiene and 75 percent polystyrene.

Comparing the control examples without block copolymer with those polymeric polyblends having varying amounts of block copolymer it is evident from the test data that the styrene block copolymer can be polyblended with polystyrene and grafted diene rubber to form a polymeric polyblend having greatly improved melt flow and gloss properties. The polymeric polyblend also retains a high modulus, elongation at fail, heat distortion and toughness as shown by the impact tests. It was unexpected that the modulus would remain high along with the heat distortion on adding large amounts of the block copolymer to the polymeric polyblend. It is to be noted that the total rubber including the grafted and block rubber is about 10.4 weight percent yet the modulus and gloss remains high along with a high melt flow. This balance of properties provides a polymeric polyblend for engineering structural uses that can be easily fabricated providing a polymeric polyblend of high utility.

EXAMPLES 7 – 9

Polymeric polyblends are prepared using the procedures and materials of Examples 1-6 except where noted.

In Examples 7–9 the block copolymers used have different weight percentages of polybutadiene as shown below:

| Example | Weight % Polybutadiene | Weight % Polystyrene |
|---|---|---|
| 7 | 45 | 55 |
| 8 | 15 | 85 |
| 9 | 10 | 90 |

The test data on compositions containing the above block copolymers are shown in Table II with proportions shown as weight percent.

TABLE II

|  | EXAMPLES 7 – 9 | | |
|---|---|---|---|
|  | 7 | 8 | 9 |
| Polystyrene | 80.3 | 80.3 | 80.3 |
| Graft Rubber | 4.7 | 4.7 | 4.7 |
| Block Copolymer | 15.0 | 15.0 | 15.0 |
| Copolymer | (55/45) | (85/15) | (90/10) |
| Rubber | 6.8 | 2.3 | 1.5 |
| Total Rubber | 11.5 | 7.0 | 6.2 |
| Melt Flow | 2.60 | 2.90 | 3.05 |
| Gloss | 60 | 83 | 85 |
| Dart Impact | 37 | 32 | 30 |
| Izod Impact | 1.30 | 1.20 | 1.19 |
| Tensile Modulus | 3.15 | 3.02 | 2.90 |

The polymer polyblends having block copolymers with 45 percent, 15 percent and 10 percent polybutadiene were analyzed for particle size and the particle havng an average particle diameter of 0.05, 0.006 and 0.004 microns for the rubber moiety of the copolymer particle. It is evident from the data that the smaller particles of the 90/10 styrene/butadiene S/B block copolymer provide higher flow and gloss than the larger particles of 55/45 S/B block copolymer. However, a balance of properties can be realized, e.g. the large particles can provide higher impact strength and modulus if those properties should be maximized yet have improved flow and impact over convention high impact polystyrene polyblends using large particle size grafted rubbers only as shown in Examples 1 and 2.

It will be appreciated that, while the embodiments of the present invention as shown and described herein are necessarily limited to a few forms of the present invention, many variations and modifications thereof are feasible and practical without departing from the spirit and scope of the present invention disclosed and claimed herein.